United States Patent Office 2,758,009
Patented Aug. 7, 1956

2,758,009

PURIFICATION OF TITANIUM TETRACHLORIDE

William D. Guthrie, Boulder City, Nev., assignor to Titanium Metals Corporation of America, Pittsburgh, Pa., a corporation of Pennsylvania No Drawing. Application August 23, 1955,
Serial No. 530,193

4 Claims. (Cl. 23—87)

This invention relates to the production of titanium tetrachloride, and more particularly to the purification of titanium tetrachloride employing a reactive sulfide as a chemical treating agent.

Titanium tetrachloride is normally produced by chlorination of rutile or ilmenite in the presence of carbon at elevated temperatures. The crude $TiCl_4$, which is formed by condensation of the vapors produced by the chlorination reaction, contains a variety of impurities. These may include free chlorine, aluminum-chloride, silicon-chloride, phosgene and vanadium compounds. Certain of these impurities may be separated from the $TiCl_4$ product by distillation, but some, particularly the vanadium present as an oxychloride, cannot practically be so separated because of the fact that the boiling point of this compound is so close to that of $TiCl_4$. A chemical treatment is therefore employed to precipitate such impurities in order to facilitate their separation. A reactive sulfide has been found efficient and, although the mechanism by which it acts is not known with certainty, it precipitates vanadium and other impurities in the form of solid compounds which are readily separated from $TiCl_4$ by settling, filtration or distillation. Hydrogen sulfide gas is an advantageous reagent, being readily available and conveniently introduced into the crude liquid $TiCl_4$.

Free chlorine, which is almost always present in crude $TiCl_4$, reacts with sulfides, particularly $H_2S$, to form sulfur monochloride. This compound has a boiling point of 135.6° C., which is obviously so close to the boiling point of $TiCl_4$ (136.4° C.) that it cannot be removed by fractional distillation, and being soluble in $TiCl_4$ is carried through into the purified product. When the purified $TiCl_4$ is employed as the raw material for production of titanium metal, sulfur monochloride is an objectional constituent since it adversely affects the quality of the titanium metal and in addition reacts in some way with ferrous materials used in purification equipment; often resulting in production of undesirable sulfide precipitates in distillation columns and other apparatus.

It is therefore a principle object of this invention to provide an improved method for the purification of titanium tetrachloride. A further object of the invention is to provide a method for production of purified titanium tetrachloride suitable for the manufacture of titanium metal. Another object of this invention is to provide a method for purification of titanium tetrachloride employing a reactive sulfide as a chemical treating agent without the disadvantages that have heretofore been associated with such a process. These and other objects of this invention will be apparent from the following description thereof.

In its broadest aspect this invention contemplates treatment of crude chlorine-containing $TiCl_4$ with a reactive sulfide to precipitate vanadium and other impurities. As a result of such treatment, the free chlorine content of the crude $TiCl_4$ is converted to sulfur monochloride. Following treatment with the reactive sulfide the $TiCl_4$ is treated with chlorine gas in amount at least sufficient to convert the sulfur monochloride to sulfur dichloride. Following the chlorine addition the $TiCl_4$ is subjected to fractional distillation to separate sulfur dichloride which has a boiling point of 59° C. and any excess chlorine added which is, of course, also a low boiling point constituent. Preferably, for most efficient operation, the solids are separated either by decantation, filtration or a distillation step before the $TiCl_4$ is fed to the fractionating column. The product produced according to the process of this invention will be found to be free from sulfur-chloride compounds, as well as those impurities normally removed by chemical treatment and fractional distillation.

As previously pointed out, treatment of crude $TiCl_4$ with a reactive sulfide, such as $H_2S$, results in interreaction of any free chlorine present in the crude $TiCl_4$ with the sulfide to produce sulfur monochloride. Apparently this reaction occurs before the reaction in which the sulfide precipitates impurities, such as vanadium compounds, and sufficient $H_2S$ is therefore always added so that the combination of the chlorine and the sulfur inevitably results in the formation of the monochloride. While sulfur monochloride has a boiling point of 135.6° C., sulfur dichloride has a boiling point of 59° C. and is readily separated from the tetrachloride by fractional distillation. Conversion of sulfur monochloride to sulfur dichloride therefore places the undesirable sulfur-chloride compound in a condition in which it may be easily removed with other low boiling point impurities.

The chemical treatment step is accomplished by adding the reactive sulfide, for example $H_2S$, to the liquid crude $TiCl_4$ while agitating. The $H_2S$ is readily absorbed and apparently combines with vanadium and other impurities to form solid precipitates. The amount of $H_2S$ to be added is most conveniently determined by analytical determination of the vanadium content of a sample of the treated liquid from which the solids have been separated. A vanadium content of 0.01% or below indicates sufficient treatment to produce a product of satisfactory purity.

If desired at this stage, the $TiCl_4$ may be separated from the solids resulting from the previous treatment step by decantation or settling, filtration or evaporation of the $TiCl_4$. This results in a cleaner feed to the fractionation column and is helpful, although not essential. It is preferred to accomplish this separation by distillation and if the $TiCl_4$ vapors are condensed in a hot condenser, maintained for example between 90° and 120° C., impurity constituents, including solubilized $H_2S$, which boil below such temperatures will also be separated. The separation of any residual $H_2S$ at this stage is advantageous but not essential, since later treatment with an excess of chlorine will readily convert any small amount of soluble $H_2S$ to sulfur dichloride, which will be separated in the final fractional distillation.

Chlorine may be added to the treated $TiCl_4$ in any convenient manner, and elevated temperatures are not essential since chlorine gas oxidizes and combines with sulfur monochloride at normal room temperatures. However, elevated temperatures may advantageously be employed to insure rapid and complete oxidation of small amounts of sulfur monochloride and a convenient temperature will be found to be about that of the boiling point of $TiCl_4$. At least sufficient chlorine should be added conveniently, by bubbling this gas into the tetrachloride liquid, to stoichiometrically form sulfur dichloride, preferably an excess in the order of up to 50% or more is desirable in order to insure complete conversion under practical operating conditions. The excess chlorine is not detrimental except insofar as it involves additional cost for this material, since any unreacted chlorine will be simply absorbed in the tetrachloride as such and will be readily removed together with other low boiling constituents in the later fractional distillation step.

The fractional distillation of the treated TiCl₄ to separate sulfur dichloride and excess chlorine, if present, is accomplished according to known principles. Conveniently a fractionating column over a TiCl₄ boiler may be employed in which the temperature at the bottom is maintained at the boiling point of TiCl₄. The top of the column is maintained somewhat below the TiCl₄ boiling point, for instance, 90° to 130° C., so that constituents boiling below this will be maintained as vapors and separated by passage out of the column. The top exhaust vapors may be refluxed if desired to produce a cleaner separation and prevent appreciable loss of TiCl₄ with the low boilers, and a reflux ratio between 10 to 1 and 100 to 1 will be found advantageous. Preferably the feed is introduced into the column intermediate the top and bottom thereof, and the purified product is collected in the boiler at the base of the column.

The following example is shown to illustrate an embodiment of this invention.

*Example 1*

A sample of crude TiCl₄ was taken containing various impurities including vanadium compounds and 0.05% by weight free chlorine. Hydrogen sulfide was added to the crude TiCl₄ in a tank while agitating and maintaining the temperature of the TiCl₄ close to boiling. The hydrogen sulfide was added until by analytical test of a sample the vanadium content of the liquid separated from any solids was reduced below 0.01%. This involved addition of approximately ½% by weight H₂S. The resulting mixture was evaporated to separate solid vanadium compounds and other impurities and the TiCl₄ vapors condensed to liquid at a temperature slightly below its boiling point. The treatment and evaporation with hot condensation resulted in a TiCl₄ liquid purified of vanadium compounds and other impurities having boiling points substantially different from its own, but still containing 0.03% sulfur monochloride.

The liquid TiCl₄ was then treated in a tank with chlorine gas in amount of 50% excess of the stoichiometric amount to convert the sulfur monochloride to sulfur dichloride and this mixture boiled to vaporize the TiCl₄ and to insure most efficient reaction of the chlorine to oxidize sulfur monochloride to sulfur dichloride. The resulting vapors were transferred to a distillation column having a TiCl₄ boiler at its base, the temperature of the column being maintained at the TiCl₄ boiling point (136.4° C.) at the bottom and at about 110° C. at the top. The vapors from the top of the column were refluxed back employing a reflux ratio of about 50 to 1 to insure efficient separation of particularly sulfur dichloride and excess chlorine. The purified TiCl₄ was removed from the boiler at the base of the column.

To demonstrate the advantage of treatment to eliminate sulfur monochloride, a sample of similar TiCl₄ to that processed in Example 1 was treated with H₂S and fractionally distilled. The purified TiCl₄ which contained 0.03% sulfur monochloride was converted to metallic titanium by reduction with metallic magnesium in a precisely controlled laboratory test unit. The titanium metal produced showed a Brinell hardness of 109. The purified TiCl₄ produced in Example 1 was also tested under identical conditions and produced titanium metal having a Brinell hardness of 87.5.

I claim:

1. In a process in which crude titanium tetrachloride containing free chlorine is purified by treatment with a reactive sulfide, the steps comprising; treating said titanium tetrachloride with hydrogen sulfide in amount at least sufficient to precipitate the vanadium and other impurities contained therein and thereby forming sulfur monochloride solubilized in said titanium tetrachloride, adding chlorine to said treated titanium tetrachloride in amount at least sufficent to convert the sulfur monochloride content thereof to sulfur dichloride and separating the so-formed sulfur dichloride from the titanium tetrachloride by fractional distillation.

2. In a process in which crude titanium tetrachloride containing free chlorine is purified by treatment with a reactive sulfide, the steps comprising; treating said titanium tetrachloride with hydrogen sulfide in amount at least sufficient to precipitate the vanadium and other impurities contained therein and thereby forming sulfur monochloride solubilized in said titanium tetrachloride, separating the precipitated vanadium and other impurities, adding chlorine to said treated titanium tetrachloride in amount at least sufficient to convert the sulfur monochloride content thereof to sulfur dichloride and separating the so-formed sulfur dichloride from the titanium tetrachloride by fractional distillation.

3. In a process in which crude titanium tetrachloride containing free chlorine is purified by treatment with a reactive sulfide, the steps comprising; treating said titanium tetrachloride with hydrogen sulfide in amount at least sufficient to precipitate the vanadium and other impurities contained therein and thereby forming sulfur monochloride solubilized in said titanium tetrachloride, separating the precipitated vanadium and other impurities by distillation of the titanium tetrachloride, adding chlorine to said treated titanium tetrachloride in amount at least sufficient to convert the sulfur monochloride content thereof to sulfur dichloride and separating the so-formed sulfur dichloride from the titanium tetrachloride by fractional distillation.

4. In a process in which crude titanium tetrachloride containing free chlorine is purified by treatment with a reactive sulfide, the steps comprising; treating said titanium tetrachloride with hydrogen sulfide in amount at least sufficient to precipitate the vanadium and other impurities contained therein and thereby forming sulfur monochloride solubilized in said titanium tetrachloride, adding chlorine to said treated titanium tetrachloride in amount from that stoichiometrically required to convert the sulfur monochloride to sulfur dichloride and up to 50% in excess thereof, and separating the so-formed sulfur dichloride from the titanium tetrachloride by fractional distillation.

References Cited in the file of this patent

UNITED STATES PATENTS 2,370,525    De Witt _____ Feb. 27, 1945